United States Patent [19]

Itoh et al.

[11] Patent Number: 4,496,209

[45] Date of Patent: Jan. 29, 1985

[54] OPTICAL BEAM SCANNING APPARATUS INCLUDING A CYLINDRICAL LENS HAVING ITS OPPOSITE ENDS CLOSER TO THE SCANNED PLANE THAN ITS MEDIAL PORTION

[75] Inventors: Toyotsugu Itoh, Hachioji; Toshio Muramatsu, Musashino, both of Japan

[73] Assignee: Konishiroku Photo Industry Co., Ltd., Tokyo, Japan

[21] Appl. No.: 476,811

[22] Filed: Mar. 18, 1983

[30] Foreign Application Priority Data

Mar. 21, 1982 [JP] Japan ................... 57-45058
Mar. 21, 1982 [JP] Japan ................... 57-45059

[51] Int. Cl.$^3$ .................. G02B 27/17; G02B 7/02
[52] U.S. Cl. .................. 350/6.8; 350/412; 350/433; 350/434; 350/252
[58] Field of Search ............ 350/6.8, 6.7, 6.5, 6.9, 350/6.91, 412, 433, 434

[56] References Cited

U.S. PATENT DOCUMENTS

| | | | |
|---|---|---|---|
| 3,750,189 | 7/1973 | Fleischer | 350/6.91 |
| 3,835,249 | 9/1974 | Dattilo et al. | 350/6.8 |
| 4,253,724 | 3/1981 | Mihoura et al. | 350/6.8 |
| 4,353,617 | 10/1982 | Tokumitsu et al. | 350/6.8 |
| 4,379,612 | 4/1983 | Matsuoka et al. | 350/6.8 |
| 4,383,755 | 5/1983 | Fedder et al. | 350/6.8 |

FOREIGN PATENT DOCUMENTS

| | | | |
|---|---|---|---|
| 57-5026 | 1/1982 | Japan | 350/6.8 |
| 57-23913 | 2/1982 | Japan | 350/6.8 |

Primary Examiner—Jon W. Henry
Attorney, Agent, or Firm—James E. Nilles

[57] ABSTRACT

An optical beam scanning apparatus wherein a beam shaping device for forming a flat light beam which has a large width in the scanning direction and which is substantially parallel with the direction of the optical axis is disposed between a light source and rotary polygonal mirror, and a cylindrical lens bent to have both ends in the longitudinal direction thereof approaching to the scanned plane is disposed between a condensing lens for condensing the light beam reflected by the rotary polygonal mirror and a scanned plane in the vicinity of the latter. The rotary polygonal mirror and the scanned plane are arranged to have a conjugate relation with each other from geometrical optics. The light beam is converged so as to generate the beam waist near the scanned plane.

16 Claims, 18 Drawing Figures

FIG. 1
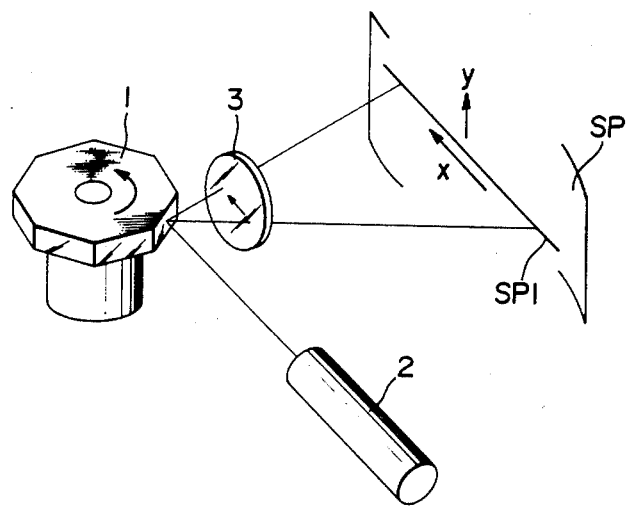
FIG. 2
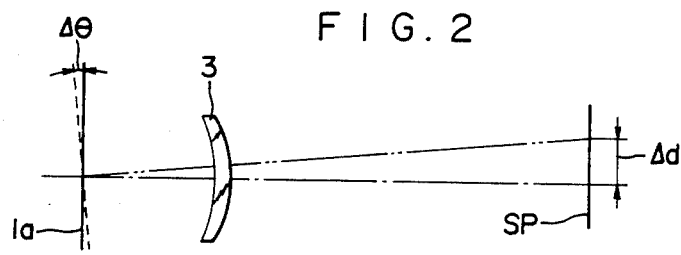
PRIOR ART FIG. 3
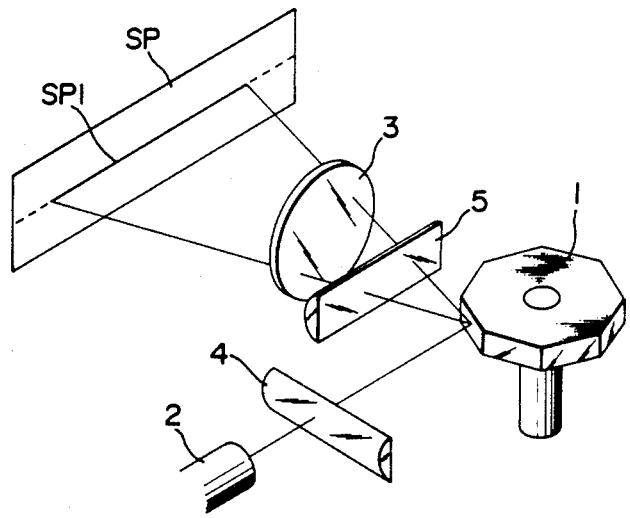

PRIOR ART FIG. 4
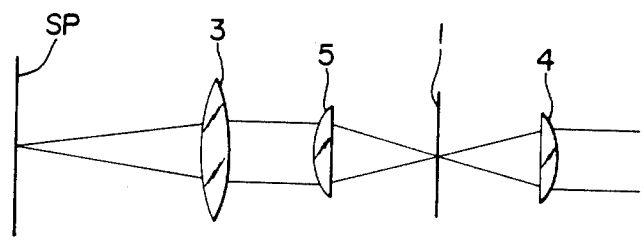
PRIOR ART FIG. 5
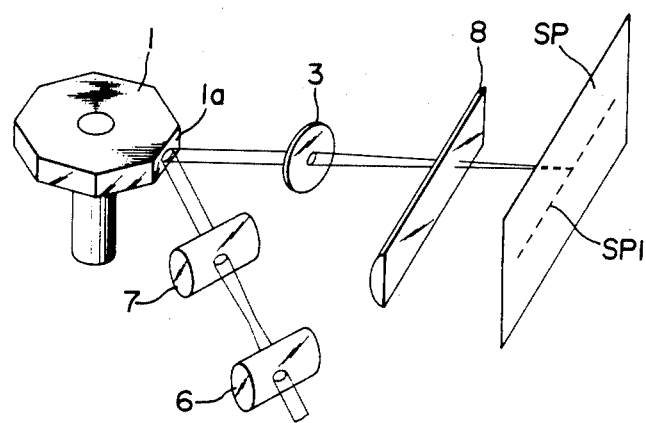
FIG. 7
PRIOR ART
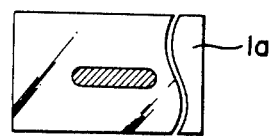
FIG. 6
PRIOR ART
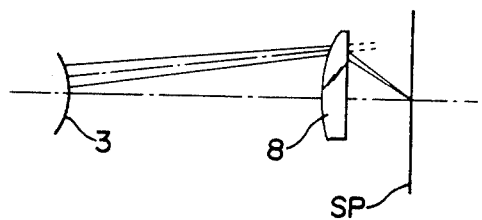

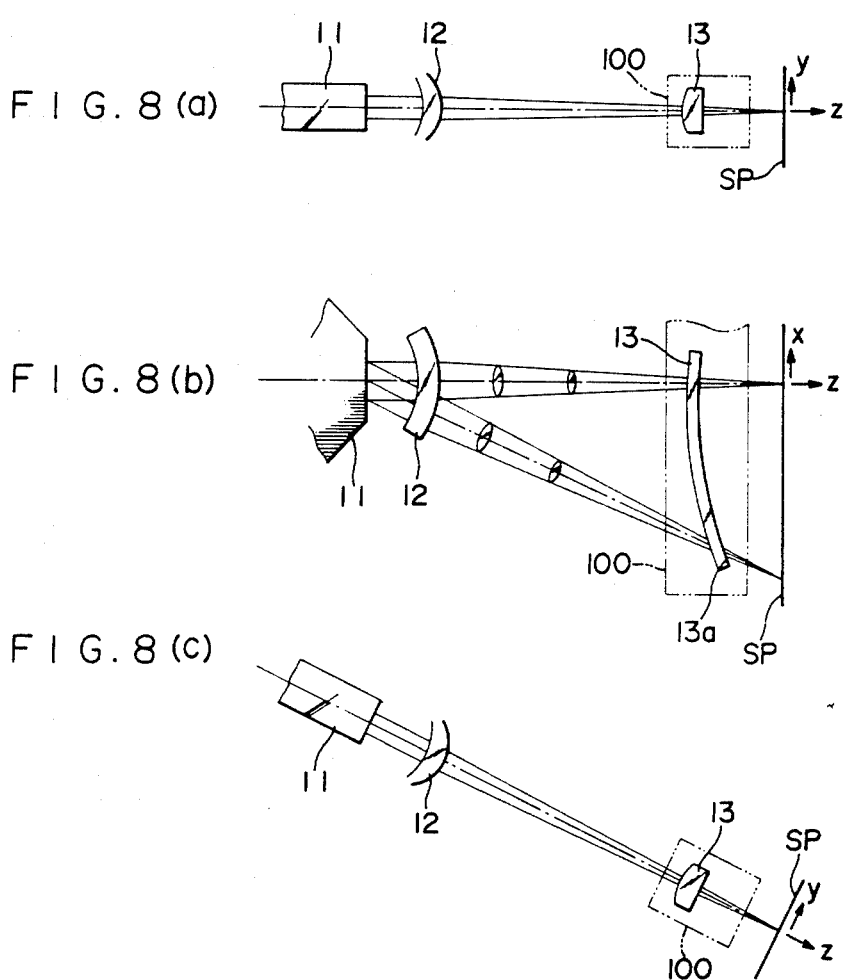

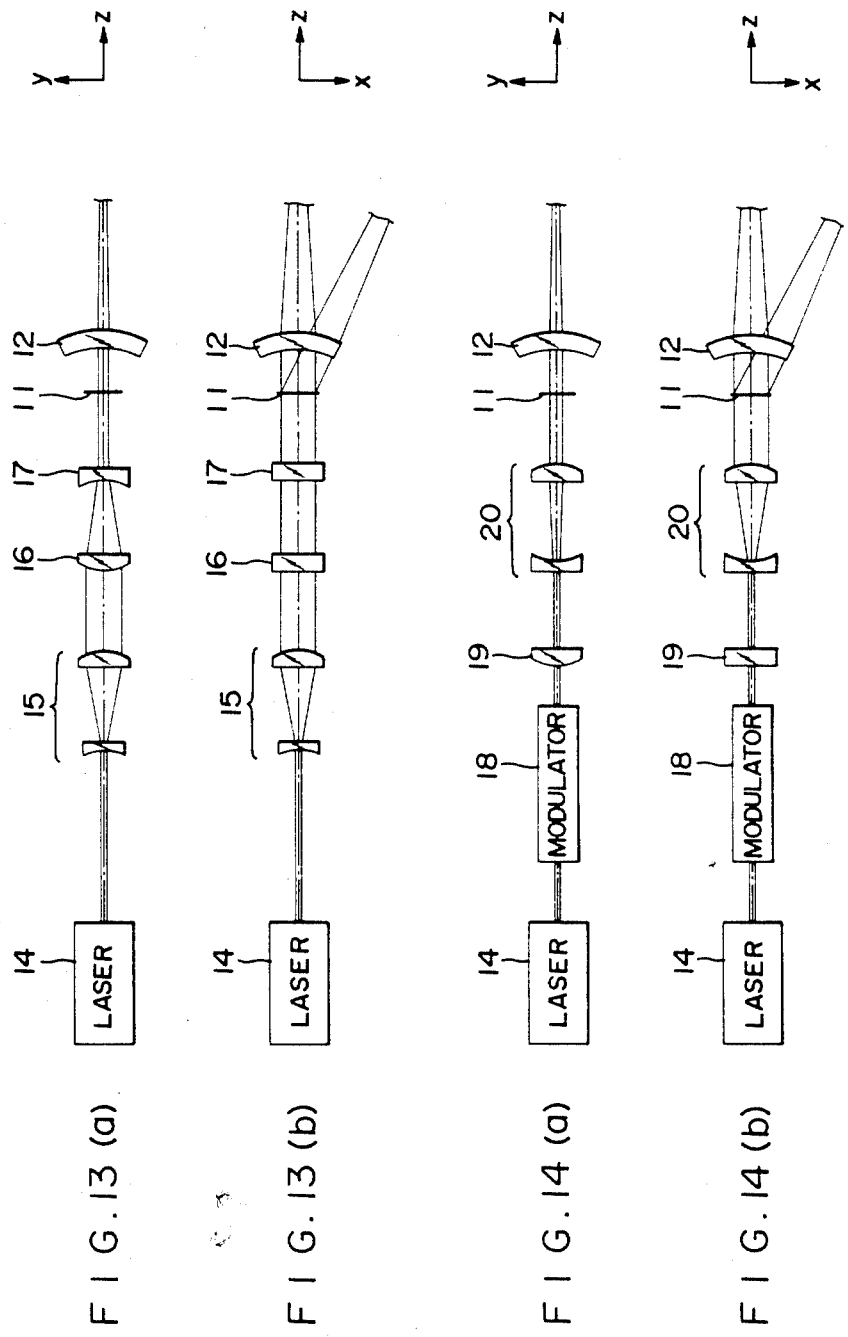

OPTICAL BEAM SCANNING APPARATUS INCLUDING A CYLINDRICAL LENS HAVING ITS OPPOSITE ENDS CLOSER TO THE SCANNED PLANE THAN ITS MEDIAL PORTION

BACKGROUND OF THE INVENTION

1. Field of the Invention

This invention relates to an optical beam scanning apparatus in which a light beam from a light source is reflected by a rotary polygonal mirror and then radiated to the scanned plane through a condensing lens for scanning of the beam.

2. Description of the Prior Art

The optical beam scanning apparatus of this kind is, as schematically shown in FIG. 1, so basically arranged that a light beam emitted from a laser 2 or other source and impinged upon a rotary polygonal mirror 1 is reflected by the mirror surface of the rotary polygonal mirror 1 rotating in the direction of an arrow and then passed through a condensing lens (f.θ lens) 3 to form a light spot which moves at a uniform speed in the scanning direction (i.e., x-direction) along a scanning line SP1 on a scanned plane SP. However, if the respective mirror surfaces are not in parallel to the rotary shaft of the rotary polygonal mirror 1 and there is a variation in angles of the mirror surfaces with respect to the rotary shaft (i.e., a tilting angle error), the light spot is shifted nonuniformly in the direction perpendicular to the scanning direction (i.e., y-direction). As shown in FIG. 2, for example, assuming that tilting angle error of the reflection surface 1a is $\Delta\theta$, there will be caused a shift amount of $\Delta d = 2f \cdot \Delta\theta$ on the scanned plane SP (where f is a focal length of the condensing lens 3). Such tilting angle error and vibrations of the rotary shaft will bring about a variation in pitch of the scanning lines, so some measure must be taken to eliminate the adverse effect. As one of such measures, it is considered that the machining accuracy can be improved to minimize tilting angle error. But in practice the machining accuracy has already reached near its limit, and even if more accurate machining can be made, there will arise additional several problems that many processes are required for machining, it is difficult to perform mass production, and the manufacturing cost becomes very high.

As shown in FIGS. 3 and 4, there has been also known heretofore another scanning apparatus such that a light beam is impinged upon the rotary polygonal mirror 1 in the form of a line parallel to the scanning direction by using a cylindrical lens 4, etc., and a cylindrical lens (or toroidal lens) 5 and the condensing lens 3 are disposed between the rotary polygonal mirror 1 and the scanned plane SP thereby to make the line beam and the scanning position to have an optical conjugate relation with respect to the direction at a right angle with the scanning direction, thus effecting correction (refer to Japanese Patent Laid-Open No. 49315/73). However, in the case of using the cylindrical lens 5 of a shape as illustrated in the figures, it is impossible to obtain a uniform spot size all over the scanning width. When a toroidal lens having the given curvature also in the x-direction is employed in place of the cylindrical lens 5, a substantially uniform spot size can be obtained. But the high cost of the toroidal lens will cause a new problem that the optical beam scanning apparatus becomes very costly.

In addition, such a conventional scanning apparatus is further known that, as shown in FIGS. 5 and 6, cylindrical lenses 6 and 7 are used to form a flat beam substantially parallel with the direction of the optical axis (FIG. 7 shows a beam shape on one mirror surface 1a of the rotary polygonal mirror 1), the beam is impinged upon the rotary polygonal mirror 1, and another cylindrical lens 8 is disposed between the condensing lens 3 and the scanned plane SP. This apparatus is also accompanied with the problem that it is impossible to obtain a uniform spot size all over the scanning width.

SUMMARY OF THE INVENTION

This invention has been accomplished in view of the foregoing problems in the art and an object of the invention is to provide, in an optical beam scanning apparatus wherein a light beam from a light source is reflected by a rotary polygonal mirror and then radiated to the scanned plane through a condensing lens for scanning of the beam, the improvement in that a beam shaping means for forming a flat light beam which has a large width in the scanning direction and which is substantially parallel with the direction of the optical axis is disposed between the light source and the rotary polygonal mirror, and a cylindrical lens bent to have both ends in the longitudinal direction thereof approaching to the scanned plane is disposed between the condensing lens and the scanned plane in the vicinity of the latter. Thus, there can be attained an optical beam scanning apparatus in which the spot size becomes uniform all over the scanning width and the pitch of the scanning lines will not be subject to a variation, with simple construction and cheaper cost.

Another object of this invention is to provide, in an optical beam scanning apparatus wherein a light beam from a light source is reflected by a rotary polygonal mirror and then radiated to the scanned plane through a condensing lens for scanning of the beam, the improvement in that a beam shaping means for forming a flat light beam which has a large width in the scanning direction and which is substantially parallel with the direction of the optical axis is disposed between the light source and the rotary polygonal mirror, and a flexible cylindrical lens and a constraining member adapted to forcibly bend the cylindrical lens to have both ends in the longitudinal direction thereof approaching to the scanned plane are disposed between the condensing lens and the scanned plane in the vicinity of the latter. With this arrangement, there can be also attained an optical beam scanning apparatus in which the spot size becomes uniform all over the scanning width and the pitch of the scanning lines will not be subject to a variation, with simple construction and cheaper cost.

Other objects and features of this invention will be apparent from the following description with reference to the drawings.

BRIEF DESCRIPTION OF THE DRAWINGS

FIG. 1 is a view showing a basic arrangement of the main part of an optical beam scanning apparatus;

FIG. 2 is a view for explaining an error of inclining angle;

FIGS. 3 to 7 are views for explaining the conventional apparatus;

FIGS. 8(a) to 8(c) are views showing an arrangement of the apparatus according to this invention;

FIGS. 12, 13(a), 13(b), 14(a) and 14(b) are views for explaining a beam shaping means.

DESCRIPTION OF THE PREFERRED EMBODIMENTS

Figure 9:
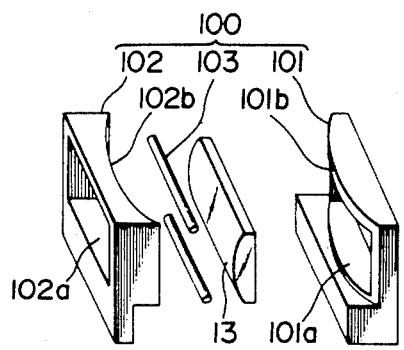
FIG. 9 is an exploded perspective view of a guide member as one example of a constraining member for a cylindrical lens.

FIGS. 8(a) to 8(c) are schematic views showing a light beam and an optical system between a rotary polygonal mirror and the scanned plane in the optical beam scanning apparatus of this invention. FIG. 8(b) is a plane sectional view, FIG. 8(a) is a side sectional view at the center of scanning, and FIG. 8(c) is a side sectional view at one end of scanning. In the figures the reference numeral 11 designates a rotary polygonal mirror having a reflection surface (i.e., mirror surface) upon which impinges, from a not shown beam shaping means, a flat light beam that has a large width in the scanning direction and that is parallel with the direction of the optical axis. Designated at 12 is a condensing lens (f·θ lens is used in this embodiment) for receiving the beam reflected by the rotary polygonal mirror 11, while 13 is a convex cylindrical lens which is flexible and disposed in the vicinity of the scanned plane SP (which is normally assumed to be a plane, or nearly planar with respect to the scanning lines), the convex cylindrical lens having a flexing force in the direction (i.e., y-direction) perpendicular to the scanning direction (i.e., x-direction). The cylindrical lens 13 is bent with the aid of a constraining member 100 in such a manner that both of its ends (only one end 13a is illustrated in FIG. 8(b)) approach the scanned plane SP.

FIG. 9 is an explanatory view showing a guide member 100 as one example of the constraining member. Referring to the figure, designated at 101 is a base side guide member, 102 is a holding side guide member, and 103 are two rods formed of an elastic material such as polyurethane and rubber (referred to as elastic rods hereinafter). It is a matter of course that those elastic rods may be formed of as one piece member or may be shaped into a sheet-like form. The cylindrical lens 13 has one surface which is brought into abutment with the base side guide members 101 and the upper and lower end portions of its other surface are pressed by the holding side guide member 102 through the elastic rods 103, thereby to maintain a predetermined bent shape. This bent shape is determined by respective shapes of arcuate curved surfaces 101b and 102b of the two guide members 101 and 102. Thus, any desired bent shape can be obtained by appropriately forming such curved surfaces. In this connection, light transparent windows 101a and 102a are respectively bored in the guide members 101 and 102 for securing an optical path of the light beam passing through the cylindrical lens. Moreover, both guide members are connected to each other using not shown screws, bonds, etc.

Figure 10:
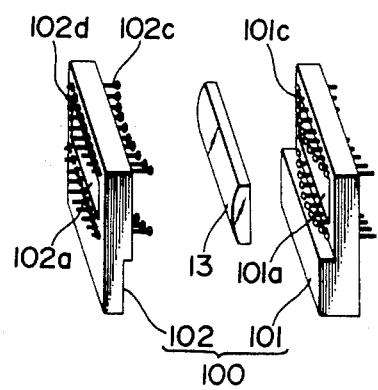
FIG. 10 is a perspective view showing another structure of the guide member.
Figure 11:
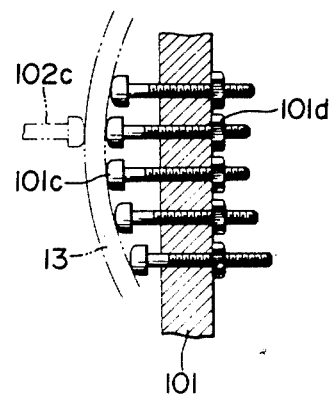
FIG. 11 is a sectional view showing a part of the guide member in FIG. 10.

As an alternative, the guide member 100 may be modified to have the structure as shown in FIG. 10. In this embodiment, a number of screw rods 101c and 102c are disposed in those portions of the guide members 101 and 102 which come into abutment with the cylindrical lens 13. The heads of these screw rods 101c and 102c are used to define the bent shape of the cylindrical lens 13 as shown in FIG. 11 (in the figures the numerals 101d, 102d denote fixing nuts). With the guide member thus structured, any desired bent shape can be set by turning the screw rods 101c and 102c.

In the above-mentioned embodiment, the reflection surface of the rotary polygonal mirror 11 and the scanned surface SP are arranged to be conjugate with each other from the standpoint of geometrical optics, so that the light beam having passed through the condensing lens 12 advances from the condensing lens 12 to the scanned plane SP while being converged in the x-direction, and while in the y-direction it starts to be converged after passing the condensing lens 12 and then advances while being rapidly converged after passing the cylindrical lens 13.

By the way, the effective focal distance of the cylindrical lens 13 is shortened due to the oblique incidence of the light beam. Therefore, if the used cylindrical lens 13 were straight in the scanning direction (i.e., x-direction), the light beam waist that would occur after passing the cylindrical lens 13 would be shifted toward the front of the scanned plane SP (i.e., on the side of the cylindrical lens 13) as the light beam is spaced from the center of scanning. According to this invention, however, the flexible cylindrical lens 13 is used in the bent state as noted previously, so that the beam waist can be always positioned near the scanned plane SP (including the scanned plane SP itself). Hereinafter, this matter will be described in detail using formulas.

Now assuming that the cylindrical lens 13 is a flat-and-convex type, the radius of curvature of its refractive surface is R, the focal length is f, and the refractive index is n, the following equation is attained among those parameters;

$$f = R/(n-1) \tag{1}$$

Moreover, assuming that an incidence angle is $\phi$ and a refraction angle is $\phi'$ when the light beam is spaced from the center of scanning and hence it impinges upon the cylindrical lens 13 obliquely, the following equation is attained among those parameters based on the law of refraction;

$$\sin \phi = n \sin \phi' \tag{2}$$

Further, assuming that the effective focal length is f' and the radius of curvature at the minute portion on the optical axis is R' when the light beam impinges upon the cylindrical lens 13 obliquely, the following equations are attained;

$$R' = R^2/(R/\cos \phi') = R \cos \phi' \tag{3}$$

$$f' = R'/(n-1) \tag{4}$$

Therefore, from the equations (1) to (4) the ratio of f/f' is given by;

$$f/f' = R/R' \tag{5}$$

$$= 1/\cos \phi'$$

$$= 1/\sqrt{1 - (\sin \phi/n)^2}$$

Herein, $f > f'$ is resulted from the relation of $$\sqrt{1 - (\sin \phi/n)^2} < 1.$$

so that the focal length is shortened, as previously noted, when the light beam impinges upon the cylindrical lens 13 obliquely. Thus, according to this invention, the curvature of the cylindrical lens 13 is set such that the size (including the shape) of beam spots on the scanned plane SP becomes uniform through convergence of the light beam by the cylindrical lens 13 in the y-direction. In particular, this embodiment is arranged in a manner that the beam waist is positioned in or near the scanned plane SP as well as that the reflection surface 1a of the rotary polygonal mirror 1 and the scanned plane SP have a conjugate relation with each other.

Consequently, by properly setting the relative positions of the rotary polygonal mirror 11, condensing lens 12, cylindrical lens 13 and the scanned plane SP, the focal lengths of those lenses, the diameter of the light beam incident to the system, the radius of curvature of the wave front thereof, and other parameters, it becomes possible to obtain any desired spot and further to make the shape (including not only a genuine circle but also an ellipse) of the spot uniform all over the scanning width.

More concretely, the recording of characters was performed as one example under such conditions that the main scanning means is composed of an optical system which comprises the cylindrical lens 13 having a focal length of 50 mm, the condensing (f.θ) lens 12 having a focal length of 350 mm, and a scanning length of 280 mm, the cylindrical lens 13 being bent into an arcuate shape whose radius is set at about 2,100 mm, and that photographic paper is placed on a stand moving at a constant speed. As a result, an almost perfect recording was obtained all over the recording width. On the other hand, in an experiment using the prior optical system as shown in FIG. 5, a good recording was obtained near the center of scanning, but there occurred defects such as thickening of lines and incompleteness of characters in both end portions of scanning.

In the case where uniformity of the spot diameter is required strongly, this invention can meet such requirement by bending the cylindrical lens 13 into the optimum shape other than an arcuate shape. Particularly, when the bent shape to be obtained is not an arc with a given curvature, it is particularly impossible to manufacture such cylindrical lens through the normal glass polishing. But, according to this invention using the flexible cylindrical lens, any desired bent shape can be formed without difficulties.

Figure 12:
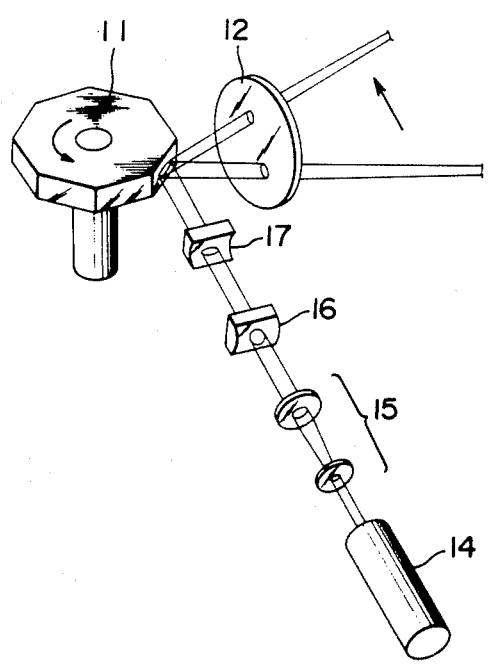

Although the beam shaping means is not shown in FIG. 8, this means can be composed of, for example, a beam enlarging means 15 formed of spherical lenses which receives a laser beam from a laser 14, and a cylindrical lens 16 with long focal length and a cylindrical lens 17 with short focal length through which the laser beam advances after passing the beam enlarging means 15, as illustrated in FIGS. 12, 13(a) and 13(b). As an alternative, the beam shaping means can be also composed of, as shown in FIGS. 14(a) and 14(b), a single cylindrical lens 19 which receives the laser beam emitted from the laser 14 through a modulator 18, and a beam enlarging means 20 consisting of spherical lenses through which the laser beam advances after passing the cylindrical lens 19. The reason why such beam shaping means must be used is to attain a light beam with the desired parameters without enlarging the optical path of the optical system prior to the rotary polygonal mirror, on the conditions that the light beam incident upon the rotary polygonal mirror 11 has a very large radius of curvature of the wave front in the y-direction and the width of the beam is small.

According to this invention, as fully described in the above, the reflection surface of the rotary polygonal mirror and the scanned plane are arranged to be substantially conjugate from goemetrical optics with each other in the y-direction using the optical system which comprises the condensing lens and the cylindrical lens, thereby to prevent pitch of the scanning lines from varying due to tilting angle error of the rotary polygonal mirror. Further, the cylindrical lens is disposed in the vicinity of the scanned plane and made to have a bent shape, thereby to make the size of spot on the scanned plane uniform. As a result, the effect of correction for inclining angle is improved in comparison with the prior art and nearly perfect uniform spots can be obtained all over the scanned plane. Thus, it becomes possible to provide apparatus for reading or recording through scanning which has a superior performance and cheaper manufacturing cost, without need for using toroidal lenses or other expensive parts.

What is claimed is:

1. In an optical beam scanning apparatus wherein a light beam from a light source is reflected by a rotary polygonal mirror and then radiated to a scanned plane through a condensing lens for scanning of the beam, the improvement in that a beam shaping means for forming a flat light beam which has a large width in the scanning direction and which is substantially parallel with the direction of the optical axis is disposed between said light source and said rotary polygonal mirror, and a cylindrical lens bent to have both ends in the longitudinal direction thereof approaching to said scanned plane is disposed between said condensing lens and said scanned plane in the vicinity of the latter.

2. An optical beam scanning apparatus according to claim 1, wherein the reflection surface of said rotary polygonal mirror and said scanned plane are arranged to have a conjugate relation with each other from geometrical optics.

3. An optical beam scanning apparatus according to claim 1, wherein said light beam is converged so as to generate the beam waist near said scanned plane.

4. An optical beam scanning apparatus according to claim 2, wherein said light beam is converged so as to generate the beam waist near said scanned plane.

5. An optical beam scanning apparatus according to claim 1, wherein said light beam is a laser beam.

6. An optical beam scanning apparatus according to claim 1, wherein said beam shaping means comprises a beam enlarging means formed of spherical lenses, and a cylindrical lens with long focal length and a cylindrical lens with short focal length through which said light beam advances after passing said beam enlarging means.

7. An optical beam scanning apparatus according to claim 1, wherein said beam shaping means comprises a single cylindrical lens, and an beam enlarging means formed of spherical lenses upon which impinges said light beam after passing said cylindrical lens.

8. In an optical beam scanning apparatus wherein a light beam from a light source is reflected by a rotary polygonal mirror and then radiated to a scanned plane through a condensing lens for scanning of the beam, the improvement in that a beam shaping means for forming a flat light beam which has a large width in the scanning direction of the optical axis is disposed between said light source and said rotary polygonal mirror, and a flexible cylindrical lens and a constraining member adapted to forcibly bend said cylindrical lens to have both ends in the longitudinal direction thereof approaching to said scanned plane are disposed between said condensing lens and said scanned plane in the vicinity of the latter.

9. An optical beam scanning apparatus according to claim 8, wherein a guide member is used as said constraining member.

10. An optical beam scanning apparatus according to claim 8, wherein the reflection surface of said rotary polygonal mirror and said scanned plane are arranged to have a conjugate relation with each other from geometrical optics.

11. An optical beam scanning apparatus according to claim 8, wherein said light beam is converged so as to generate the beam waist near said scanned plane.

12. An optical beam scanning apparatus according to claim 10, wherein said light beam is converged so as to generate the beam waist near said scanned plane.

13. An optical beam scanning apparatus according to claim 8, wherein said light beam is a laser beam.

14. An optical beam scanning apparatus according to claim 8, wherein said beam shaping means comprises a beam enlarging means formed of spherical lenses, and a cylindrical lens with long focal length and a cylindrical lens with short focal length through which said light beam advances after passing said beam enlarging means.

15. An optical beam scanning apparatus according to claim 8, wherein said beam shaping means comprises a single cylindrical lens, and an beam enlarging means formed of spherical lenses upon which impinges said light beam after passing said cylindrical lens.

16. An optical beam scanning apparatus comprising a polygonal mirror whereby a light beam radiated along an optical axis from a light source is reflected to a scanned plane through a lens system that comprises a condensing lens, and wherein the beam is caused to move along the scanned plane in a scanning direction transverse to the optical axis by rotation of the polygonal mirror, said beam scanning apparatus being characterized by:
  A. beam shaping means between said light source and said rotary polygonal mirror, arranged to form the beam from said light source into a flat beam which has its maximum width in the scanning direction and is substantially parallel to said optical axis; and
  B. said lens system comprising an elongated cylindrical lens which
   (1) is disposed between said condensing lens and the scanned plane,
   (2) extends lengthwise in the scanning direction, and
   (3) is curved along its length to have its opposite ends closer to the scanned plane than its medial portion.

* * * * *